Sept. 2, 1952 E. O. KEIZER 2,609,441
COMBINATION RADIO TELEVISION RECEIVING SYSTEM
Filed Dec. 1, 1949
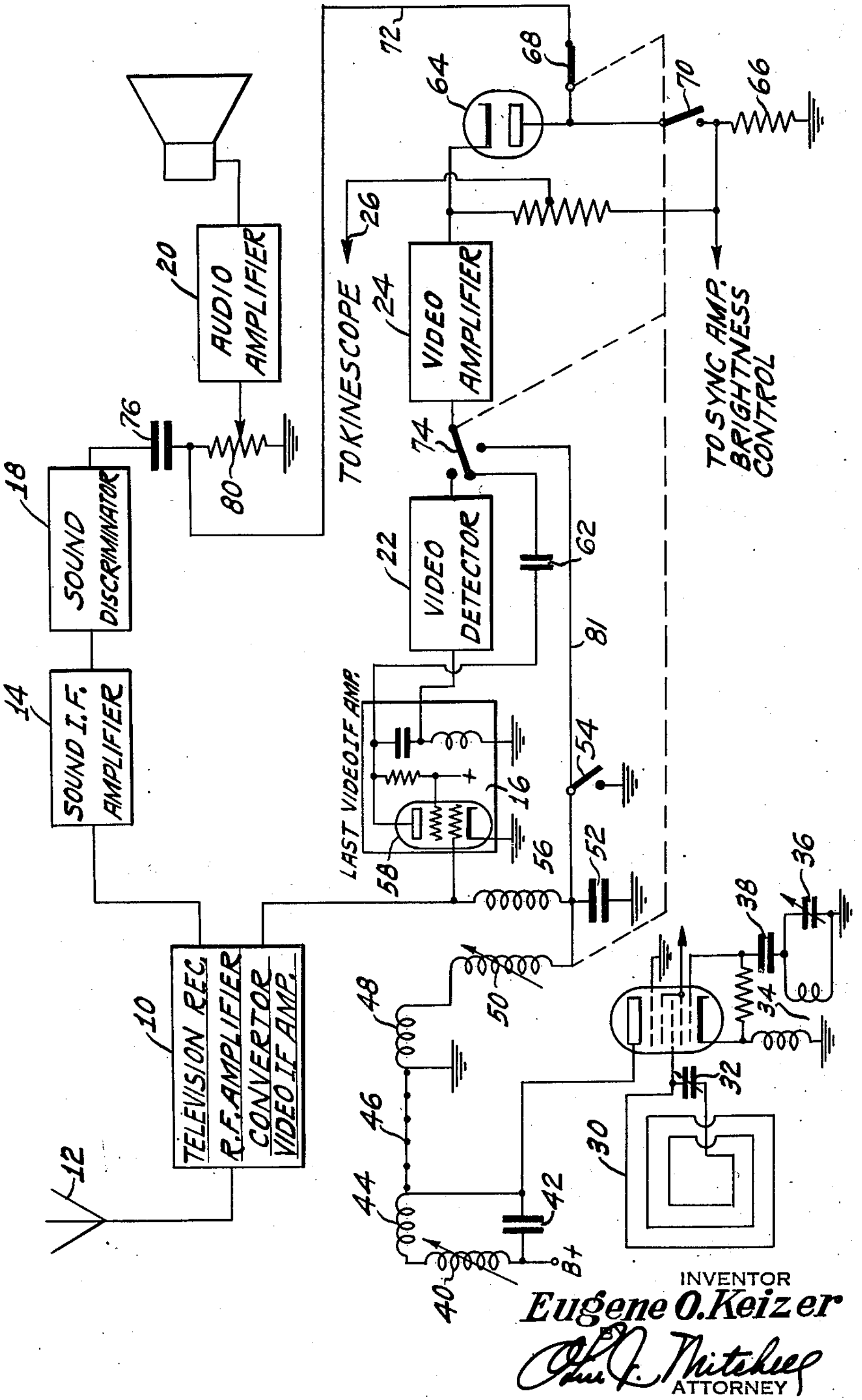
INVENTOR
Eugene O. Keizer
BY
[signature]
ATTORNEY Patented Sept. 2, 1952 2,609,441

UNITED STATES PATENT OFFICE 2,609,441

COMBINATION RADIO TELEVISION RECEIVING SYSTEM

Eugene O. Keizer, Princeton, N. J., assignor to Radio Corporation of America, a corporation of Delaware Application December 1, 1949, Serial No. 130,528

2 Claims. (Cl. 178—5.8)

The present invention relates to improvements in radio receiving systems and more particularly, although not necessarily exclusively, to combination type radio receiving equipments adapted to receive a plurality of different type signal communications transmitted on respectively different radio carriers of different carrier frequencies bearing different modes of modulation.

In more particularity, the present invention deals with an improved form of combination type receiving system finding ready application to receiving circuits such to enable reception of standard broadcast AM signals through the agency of standard television receiving circuits.

Present-day trends in the design of home instruments for the reception and reproduction of the various commercial radio broadcasting signals such as television FM broadcast, AM broadcast, etc. seem to emphasize the desirability of combining circuit functions so as to more economically provide, in a single instrument, facilities for receiving a plurality of the various radio entertainment channels.

In the case of present-day television receivers which incorporate separate receiving channels for television AM and FM television sound intelligence, there is afforded a good opportunity for re-circuiting some of the electronic elements to aid in the reception of other forms of communication. For instance, by extending the range of the radio frequency tuner section of the television receiver, it is quite possible to economically provide a very satisfactory FM broadcast receiver if the band width of the television sound channel and its associated FM discriminator is made sufficiently wide. However, up to the present time, little use has been made of the television receiver components for the reception of standard broadcast AM signals falling within the range of 540 to 1600 kc.

It is therefore a purpose of the present invention to provide a simple and economical combination type television receiving circuit which not only provides reception and reproduction of television signals but also at the expense of little additional circuitry provides high quality reception of standard broadcast AM signals.

It is further a purpose of the present invention to provide a simple and economical adapting circuit for existing television receivers which will permit the receiver to be used in the reception of standard broadcast AM signals.

The present invention is further involved with the provision of a novel system of circuitry which permits the common elements of present-day television receivers to be efficiently utilized in the reception of standard broadcast AM signals.

In order to accomplish the above objects the present invention contemplates the use of a heterodyning circuit of the type commonly found in present day AM broadcast receivers which operates to heterodyne, or selectively convert, the AM broadcast signal frequencies lying within the range of 540–1600 kc. to a somewhat lower intermediate frequency signal such as 455 kc. Through the use of a highly selective 455 kc. filter circuit, the output of the converter is then applied to the input of the television receiver video amplifier for amplification thereby. Rectifying means are then associated with the output of the video amplifier to allow the received AM standard broadcast signal to be demodulated for subsequent application to the input of the receiver sound amplifier otherwise utilized for the amplification of FM sound derived from the television receiver sound channel.

A fuller understanding of the operation of the present invention as well as other objects and advantages in addition to those set forth hereinabove may be readily gleaned from the following specification, especially when taken in connection with the accompanying drawing in which the single figure illustrates one embodiment of the present invention as applied to the standard television receiver.

Referring now to the figure there is represented by the block 10 some of the components of a typical modern-day television receiver including an RF amplifier and a converter. As is commonly the practice, signals intercepted by the antenna 12 are heterodyned by the television receiver converter to produce a sound I. F. signal applied to the sound I. F. amplifier, indicated by block 14 and a video I. F. signal applied to the video I. F. amplifier indicated by block 16. Accordingly, the output of the sound I. F. amplifier is applied to an FM discriminator indicated at block 18, whose output is generally coupled with the input of an audio amplifier 20 for reproduction of the sound accompanying the television image. The output of the video I. F. amplifier 16 is applied to a video detector 22 for obtaining a video signal which is then applied to the input of the video amplifier 24. The output of the video amplifier 24 is conventionally applied to the input of an image reproducing device, such as a kinescope as indicated at 26. For ease in illustration, the kinescope has not been shown nor have the deflection circuits for the kinescope beam been indicated.

Typical examples of the well known circuit configurations for each of the circuit blocks may be obtained in an article entitled "Television Receivers" by Antony Wright appearing in the RCA Review for March 1947. Other examples of typical circuit arrangements represented by the block diagrams may be found in an article entitled "Video Receiver Circuits Simplified" by D. D. Cole in the magazine Tele-Tech for January 1949, as well as in an article entitled "Television Receiving Systems" by C. M. Sinnett appearing in the monthly publication Electrical Engineering for June 1949. The receiving frequency range for most commercial television receiving circuits is made to give reception on channels 2 through 13 covering the frequency range of 54 mc. to 216 mc.

According to the embodiment of the present invention shown in the drawing, there is provided a typical heterodyne converter circuit adapted to convert AM broadcast signals to some intermediate frequency, such as, for example, 455 kc. This arrangement is so well known that it is not thought necessary to describe it in full detail. The input of the converter is indicated as being obtained from a conventional loop antenna 30 which is rendered tunable by the variable capacitor 32, whereas the oscillator portion of the converter tube circuit is indicated by the feedback transformer 34, tuning capacitor 36 and coupling capacitor 38. The tuning capacitor 36 is indicated as being ganged with the tuning capacitor 32 of the input circuit and are conventionally arranged to track with one another over the entire AM broadcast band. The output of the converter tube is shown to be developed across the resonant circuit comprising variable inductance 40, capacitor 42 and winding 44. The winding 44 in the embodiment illustrated constitutes the input to a 455 kc. filter indicated at 46. This may conveniently take the form of a mechanical type filter which may be made to have exceptionally sharp cutoff characteristics and provide the necessary selectivity as well as band width. Such filters are well known in the art to which the present invention pertains. The output of the filter 46 appearing across the winding 48 is in turn applied to another 455 kc. resonant circuit comprising the variable inductance 50, the capacitor 52 and the winding 48. Means such as switch 54 may be provided for selectively shunting the capacitor 52 if desired.

In the arrangement shown, the 455 kc. signal appearing across the capacitor 52 when not shunted by the switch 54 is applied via inductance 56 to the control electrode of the discharge tube 58 embraced in the last video I. F. amplifier. Thus, although the video I. F. amplifier 16 is primarily designed to amplify the video I. F. frequency which is commonly given a value of 21.75 mc., it will be apparent that with the direct application of the 455 kc. signal to the grid of the last video amplifier there will be considerable amplitude of signal developed across at the anode of the discharge tube 58.

In further accordance with the present invention, the conventional video detector 22 is bypassed by a capacitor 62 so that the 455 kc. signal appearing at the output of the video I. F. amplifier 16 may be directly applied to the input of the video amplifier 24. The output of the video amplifier 24 is, in turn, indicated as being connected with a typical D. C. sync separator and restorer circuit involving the diode 64 having load resistor 66 across which is developed clipped sync from the composite television carrier. In accordance with the present invention, the anode of the diode 64 is adapted for switched application by means of switches 68 and 70 either to the load resistance 66 or the input of the audio amplifier 20 via circuit path 72. A further switch 74 is imposed between the output of the video detector 22 in the input of the video amplifier 24.

In the operation of the present invention to receive AM broadcast signals, the switches 54, 68, 70 and 72 will be positioned as indicated in the drawing so that the 455 kc. signal developed by the converter tube 28 will be applied to the input of the last video I. F. amplifier 16 by means of the capacitor 52 and inductance 56. The 455 kc. signal of the last video amplifier 16 will, in turn, be capacitively coupled to the video amplifier 24 via capacitor 62, the switch 74 isolating the video amplifier 24 from the video detector 22. The video amplifier 24 having a band pass characteristic allowing the amplification of 455 kc. signals, will then amplify the AM broadcast I. F. signal which, in its amplified form, will appear across the D. C. restorer and sync amplifier diode 64. Since by means of switch 68 the anode of the diode 64 is connected to the input of the audio amplifier 20 through a suitable time constant circuit comprising the capacitor 76 and the resistance of the potentiometer 80, the audio modulation envelope of the AM broadcast signal will be amplified by the audio amplifier 20 for the reproduction by the loudspeaker 82.

When the combination circuit of the drawing is to be operated as a conventional television receiver, the switches 54, 68, 70 and 72 will be returned to their normal position. This will then shunt out the capacitor 52 and discontinue application of the 455 kc. signal to the input of the last video I. F. amplifier 16. Furthermore, the output of the video detector 22 will be directly connected to the input of the video amplifier 24. Moreover, the sync clipper and D. C. restorer diode 64 will no longer be connected with the input of the audio amplifier but will be conventionally connected with the load resistor 66 for the development of clipped sync.

In the practice of the present invention to receive AM broadcast signals, it is sometimes desirable to provide additional means not shown in the drawing for disabling the television converter stage embraced in the block representation 10. This prevents any possible interference from television signals during reception of AM broadcast sound. Furthermore, it may be desirable to disable the horizontal deflection circuits of the television receiver during the reception of AM broadcast sound to remove the possibility of any interference resulting from the 15 kc. horizontal sweep rate of most present day receivers.

It is to be understood that the 455 kc. filter 46 may be replaced by a conventional double tuned I. F. transformer from the AM pentagrid converter output to the first tube to be used as an I. F. amplifier in the television set. By using more tuned I. F. circuits in cascade the selectivity could be improved under such conditions. However, for ultimate simplicity, a mechanical type 455 kc. filter is highly desirable since it is found these mechanical type filters can be made to provide more than adequate selectivity and band width. As an example of the band width and selectivity which may be obtained at 455 kc. with mechanical type filters, it has been found that a 70 percent response band width of 12 kc. can be obtained with an attenuation of adjacent channel carrier 10 kc. from the center of the filter of about 54 db.

Although in the drawing, the output of the 455 kc. filter has been indicated as being directly applied to the last video I. F. amplifier, it is to be understood that the present invention is in no way limited to this arrangement. This particular circuit technique is illustrated as one which is particularly useful when the gain of the video amplifier 24 is otherwise insufficient for the reception of AM broadcast signals. For example, in conventional AM broadcast receivers, the total I. F. frequency gain is generally in the order of 4,000 times which includes 40 from the converter stage. When using mechanical filters, there is an insertion loss which causes a reduction in gain which may be as much as 30. This may then render the overall converter stage including the discharge tube 28 and the mechanical filter 46 productive of a gain not much in excess of 10. This will leave a gain of about 400 as the additional amplification required at 455 kc., the usual I. F. frequency utilized for AM broadcast reception. Generally speaking, the video amplifier stages in a present day television receiver seldom provide a gain in excess of 30 to 50 which is inadequate. If, however, as indicated in the diagram the last video I. F. amplifier is employed, an additional gain of about 10 may be obtained. To achieve this gain, it may be necessary in some instances to minimize the value of I. F. coupling capacitors from previous stages.

Accordingly, it is manifest that where in television receiver circuits sufficient gain is present in the video amplifier itself or the filter network at the output of the AM broadcast converter stage is made to have less attenuation, the use of the last picture I. F. amplifier, such as 16 in the drawing, may not be necessary. Under such conditions, the output of the AM broadcast converter may be directly applied to the input of the video amplifier 24 through lead 81 and switch 74 and the coupling capacitor 62 placed in shunt with the video detector would not, under those conditions, be required.

It is further to be understood that, although the particular switching arrangements shown in the drawing have been found to provide the necessary re-circuiting of conventional television receiver components to permit the successful practice of the present invention, other switching arrangements may be successfully utilized without departing from the spirit and scope of the present invention.

Having thus described my invention, what I claim is:

1. A communications receiver comprising a first signal source of demodulated television signals, a second signal source of intermediate frequency standard broadcast signals, a wide bandpass amplifier having input and output terminals, first switching means to selectively connect the input terminal of said wide bandpass amplifier to said first and second signal sources, rectifier means having input and output terminals, means connecting the input terminal of said rectifier means to the output terminal of said wide bandpass amplifier, a kinescope, an audio amplifier, and second switching means to selectively connect the output terminal of said rectifier means to said kinescope and to said audio amplifier.

2. A communications receiver comprising a first signal source of intermediate frequency television signals, a second signal source of intermediate frequency standard broadcast signals, a restricted bandpass amplifier having input and output terminals, switching means to selectively connect the input terminal of said restricted bandpass amplifier to said first and second signal sources, a wide bandpass amplifier having input and output terminals, a first connection including a video detector between the restricted bandpass amplifier output terminal and the wide bandpass amplifier input terminal, a second connection between the restricted bandpass amplifier output terminal and the wide bandpass amplifier input terminal, switching means to selectively connect together said amplifiers through said first and second connections, rectifier means having input and output terminals, means connecting the input terminal of said rectifier means to the output terminal of said wide bandpass amplifier, a kinescope, an audio amplifier, and switching means to selectively connect the output terminal of said rectifier means to said kinescope and to said audio amplifier.

EUGENE O. KEIZER.

REFERENCES CITED

The following references are of record in the file of this patent:

UNITED STATES PATENTS

| Number | Name | Date |
|---|---|---|
| 2,270,652 | Espley | Jan. 20, 1942 |
| 2,491,808 | Fyler | Dec. 20, 1949 |

FOREIGN PATENTS

| Number | Country | Date |
|---|---|---|
| 450,263 | Great Britain | July 14, 1936 |